United States Patent [19]
Ensinozo

[11] 3,967,683
[45] July 6, 1976

[54] EQUINE HOOFWEAR

[76] Inventor: Juan Saavedra Ensinozo, Primera Calle del Casquillo, Edificio "Maitena", Apartment No. 7, Urbanizacion Avila, Caracas, Venezuela

[22] Filed: Sept. 27, 1974

[21] Appl. No.: 509,816

[52] U.S. Cl. .................................. 168/4; 168/19
[51] Int. Cl.² ......................................... A01L 3/00
[58] Field of Search ............... 168/4, 8, 12, 17, 18, 168/19, 24, DIG. 1

[56] References Cited
UNITED STATES PATENTS

| | | | |
|---|---|---|---|
| 601,541 | 3/1898 | Anderson | 168/4 |
| 730,483 | 6/1903 | Schwartz | 168/19 |
| 1,033,315 | 7/1912 | Harrell | 168/4 |
| 1,078,479 | 11/1913 | Zuber | 168/19 |
| 1,211,268 | 1/1917 | Zadina | 168/19 |
| 1,471,827 | 10/1923 | Carman | 168/18 |
| 2,056,373 | 10/1936 | Steinmetz | 168/4 |
| 3,794,119 | 2/1974 | Paiso et al. | 168/18 |

*Primary Examiner*—Louis G. Mancene
*Assistant Examiner*—J. G. Lever
*Attorney, Agent, or Firm*—Imirie, Smiley & Linn

[57] ABSTRACT

Equine footwear according to the invention comprises a split ring of a configuration corresponding to the peripheral outline of a hoof of an ungulate animal with the split disposed at the rear or heel portion thereof. The ring in cross section constitutes an acute angle with a lower flange disposed at a slight angle to the horizontal for fitting beneath the generally concave bottom of the hoof, and an upwardly extending flange for surrounding the outer wall of the hoof so that the device constitutes the equivalent of a slipper. The footwear is made of a material having some pliancy or flexibility such as a soft metal but preferably of a plastics material so that it can conform to the particular hoof to which it is applied and permit expansion and contraction of the hoof during movement of the animal. The opposed ends of the ring may be adjustably and releasably secured together to accommodate adjustment and replacement.

8 Claims, 7 Drawing Figures

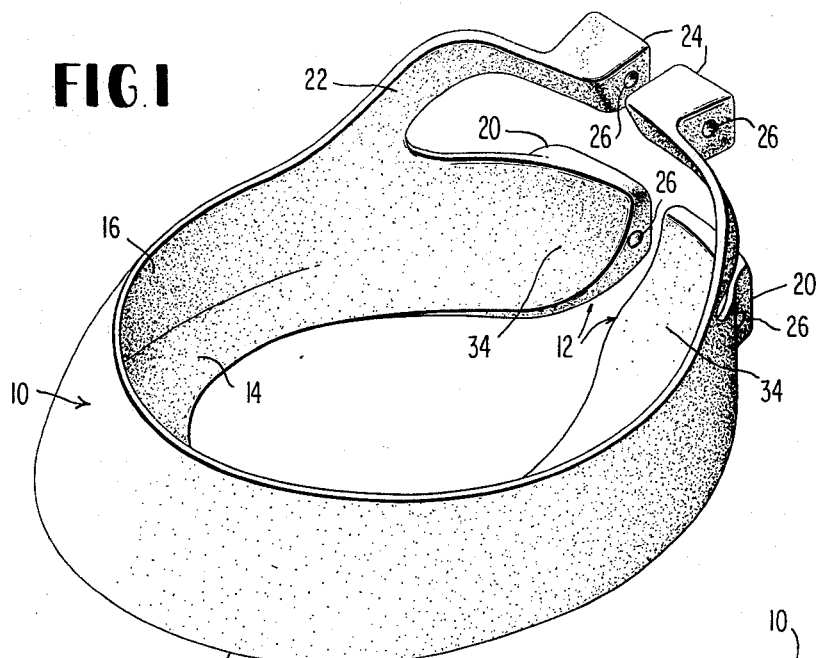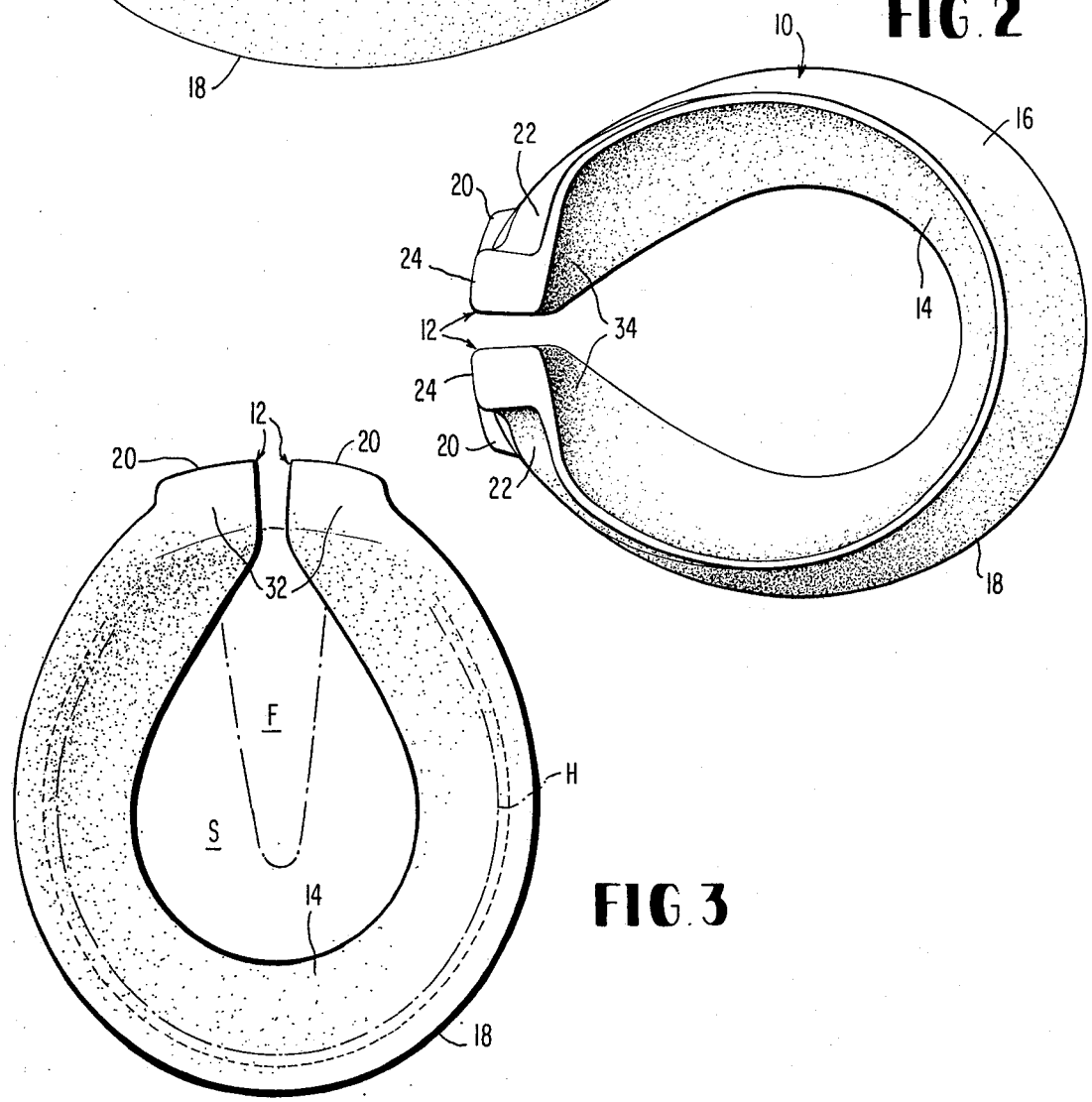

EQUINE HOOFWEAR

BACKGROUND OF THE INVENTION

The hoofs of ungulate animals comprise a hard shell surrounding and secured to a sole by a white layer or white line and a frog substantially enclosed within the sole. The shell is equivalent to human nails in that it continually grows lengthwise so that its lower edge extends below the bottom surface of the hoof and protects the relatively soft and sensitive sole and frog. In normal use the bottom edge of the horn or shell is worn away by traveling over the terrain and in this process as the weight of the animal is imposed upon and then removed from the hoof, the horn expands and contracts, or at least the sidewall portions thereof, which transmits such movement through the sole to the frog to impart to the frog the necessary movement to function as a pump for forcing blood through the animals legs and the hoof.

Upon domestication of the horse and more particularly the development of hard surface roads and streets, the horn or shell was worn away by the constant friction with such hard surfaces to the extent that it did not provide sufficient protection to the sole and frog. To overcome this problem, shoes were devised of iron and to attach such shoes to the hoof nails were passed through the shoe and driven through the horn to hold the shoe in place. While the iron maintains the sole and frog above contact with the surfaces over which the animal travels, it inhibits the fluctuation of the horn to provide the pumping action for the frog so that the animals frequently develop hoof problems. Moreover, unless the blacksmith is skilled in applying the shoes, the nails engage the sensitive sole and produce soreness of a nature entirely foreign to the natural operations of the hoof. Finally, due to the effort of the horn to fluctuate, the nails engaged in the horn in due course wear loose and the shoe can be lost. Also, it is necessary periodically to replace the shoes in order to remove the excess portion of the horn because of its continuous growth.

SUMMARY OF THE INVENTION

The present invention resides in a slipper-like footwear in the form of a split ring having a configuration substantially corresponding to the peripheral configuration of a hoof with the split at the rear or heel portion of the slipper. The ring is of an angular cross-sectional configuration and includes a bottom flange that is disposed at a slight angle to the horizontal so that it will conform to and underlie the bottom of a hoof, and an upwardly extending flange at an acute angle to the lower flange for surrounding the sidewall of the horn. The slipper has a ground engaging surface extending around its outer edge portions and which substantially is planar for engaging the ground surface in substantially the same manner as the natural use of a horses hoof. The slipper is composed of a pliable or slightly flexible material such as a soft metal or, preferably, a plastics material that will permit the normal fluctuation of the horn for actuating the pumping function of the frog. If necessary, the ends of the split ring are releasably and adjustably connected to secure the slipper around the hoof but enable adjustment to accommodate size and permit the aforementioned fluctuation of the horn.

BRIEF DESCRIPTION OF THE DRAWINGS

FIG. 1 is a view in perspective of an equine footwear in accordance with the present invention;
FIG. 2 is a top plan view of FIG. 1;
FIG. 3 is a bottom plan view of FIGS. 1 and 2.

DETAILED DESCRIPTION OF THE INVENTION

Figure 4:
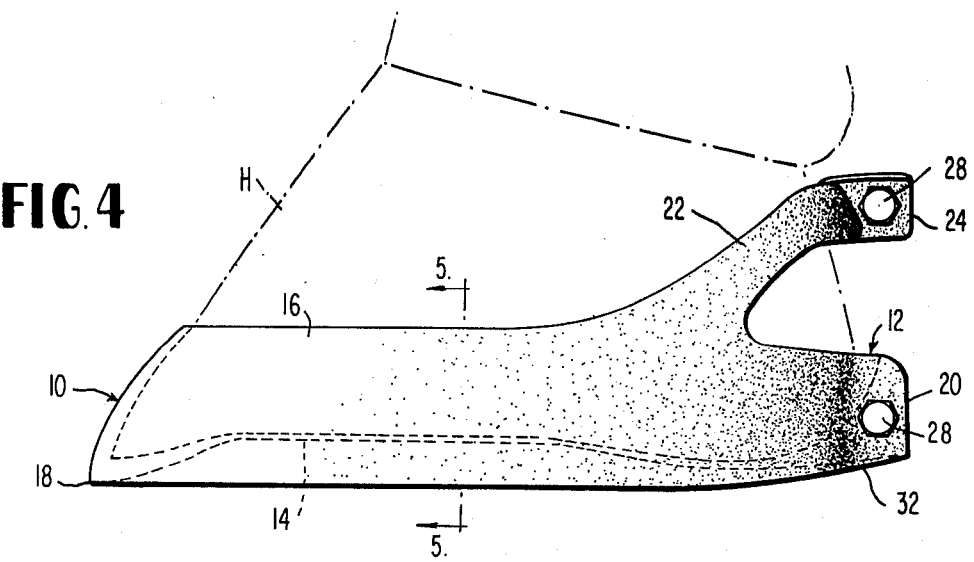
FIG. 4 is a side view in elevation of FIGS. 1 and 2.

Referring now in detail to the drawings, specifically FIG. 3, as indicated in phantom lines, the bottom surface of a hoof comprises an outer shell or horn H surrounding a sole S and enclosing a frog F. As best shown in FIG. 1, equine footwear according to the present invention comprises a split ring 10 having the ends 12 at the split disposed at the rear or heel portion thereof, the ring including an inwardly extending lower flange 14 for underlying the hoof and an upwardly extending flange 16 for surrounding the outer surface of the hoof.

The lower and upper flanges 14 and 16 approximately are two cm wide and are disposed at an acute angle so that the lower flange closely follows the normal concavity of the bottom or sole of a hoof, and the upper flange 16 closely fits around the lower portion of the horn or shell H surrounding a hoof. The flanges both taper toward their free edges and are thicker at their juncture which terminates in a sharp-edge exterior angle 18 that approximates the normal outer edge of the horn or shell H of an unshod hoof. Thus, the slipper enables the hoof to function in a normal natural manner.

The end portions 12 of the slipper curve inwardly toward each other to substantially surround a hoof and are provided with lugs 20 respectively extending outwardly or rearwardly from each end to function as handles for spreading the slipper to fit it on a hoof. Forwardly of the ends 12 and extending upwardly and rearwardly from each side, the slipper is provided with a pair of straps 22 that curve inwardly toward each other and each terminates in an outwardly or rearwardly extending lug 24.

The straps extend upwardly at an angle of approximately 45° so that the lugs 24 will fit immediately below the joint or "ankle" between the leg and hoof of the horse whereas the lugs 20 coincide substantially with the break or cavity in the horn or shell H adjacent to frog F. The upper lugs 24 have aligned bores 26 for receiving a releasable, adjustable clamp 28, such as a bolt, for securing the slipper on a hoof, and the lugs 20 may also have bores 26 and to be connected by a clamp 28, the material of the slipper having sufficient flexibility to enable flexing of the horn H for operating the frog F.

Figure 5:
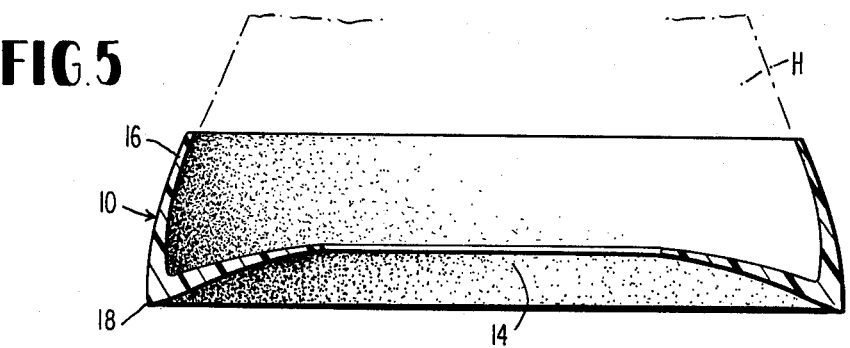
FIG. 5 is a cross-sectional view taken on line 5—5 of FIG. 4.
Figure 6:
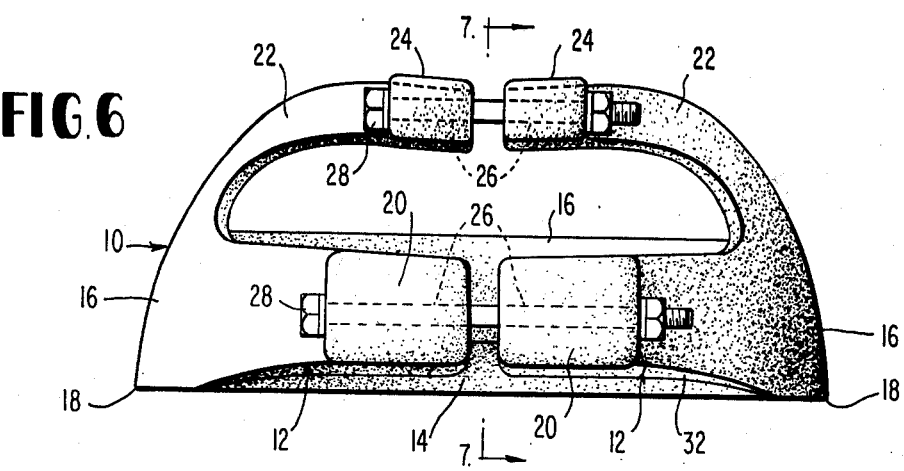
FIG. 6 is a rear view in elevation of FIG. 4.
Figure 7:
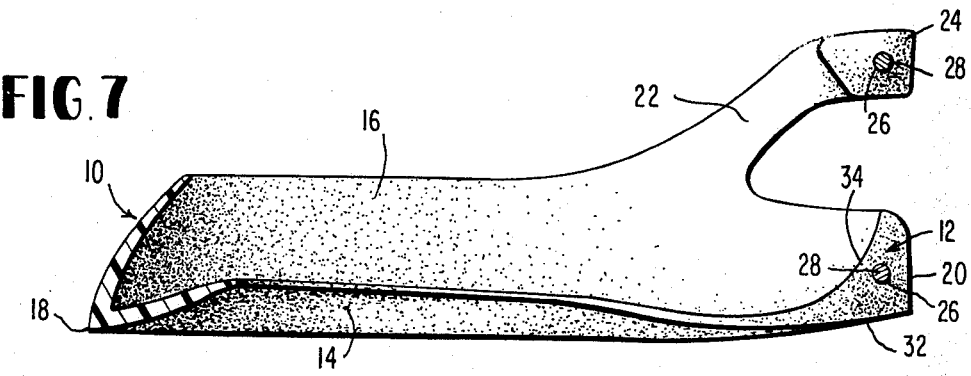
FIG. 7 is a cross-sectional view taken on line 7—7 of FIG. 6.

As best shown in FIGS. 5 and 7, the bottom surface of the lower flange 14 slopes or is inclined upwardly to preclude ground engagement that might cause pressure on the sensitive sole S of the hoof. However, the peripheral edge 18 of the bottom flange surface lies substantially flat and substantially is coplanar around the front and sides, except for the rear portions 32 that are relatively flat and are inclined upwardly and rearwardly very slightly.

The rear or heel portion of a horse's hoof is rounded and curved inwardly from the sides and upwardly from the bottom. To properly support the heel portion of the hoof, as best shown in FIGS. 1, 2 and 7, the upper surface of the lower flange 14 is curved upwardly at the end portions 12 and the inner surface of the upper flange 16 is curved inward and upwardly at the end portions 12 so that the two surfaces blend to define curved areas 34 for cradling the hoof heel. Thus, the inclined surfaces 32, which essentially constitutes the bottom of the end portions 12 and the edge 18 and area 32 approximate the normal configuration of the edge of the horn H in the natural, unshod state so that the slipper enables the hoof to function in a normal natural manner.

The slipper may be made of lightweight material having sufficient pliability, flexability or resilience to enable spreading the end portions 12 to enable fitting the slipper on or removing it from a hoof, and when mounted to enable forcing the end portions 12 toward each other to fit the slipper to the particular hoof. The slipper may be constituted of metal such as aluminum or alloys thereof but preferably is molded of a suitable synthetic plastic with at least the bottom surface areas 14 and 32 comprising a material having a high resistance to abrasion, such as polyurethane which also is inherently sufficiently flexible and expansible to enable flexing of the horn H even though the lugs 20 are secured by a clamp 28.

From the foregoing description it becomes evident that equine footwear according to the invention has the unique advantages of simplicity of design and economy of construction as well as ease of mounting on or removing from a hoof without requiring services of a blacksmith and without danger of injury to the hoof. Furthermore, it supports the hoof in a normal and natural manner and enables function of the hoof in the same manner as an unshod hoof.

What is claimed is:

1. Equine footwear comprising a split ring of a configuration approximating the configuration of a hoof and having the split at the heel portion thereof, said ring having an acute angle cross-section including a lower flange for underlying the bottom of a hoof and an upper flange for overlying the outer sides and front of a hoof, said lower flange being inclined upwardly to conform to the normal concavity of the bottom of a hoof, and said upper flange being inclined inwardly to conform to the normal slope of the outer surfaces of the front and sides of a hoof, said ring constituting a resilient material enabling expansion and contraction thereof for mounting and dismounting said ring relative to a hoof and for enabling said hoof to expand and contract during movement of the animal, and means for adjustably and releasably securing the ring ends at the split to positively mount the ring on the hoof, said securing means comprising a strap extending at an angle upwardly and rearwardly from each side of said ring with the ends of said straps curved inwardly toward each other and overlying said ring ends, and releasable, adjustable fastener means joining said strap ends and said ring ends, said straps being integral with said ring.

2. Equine footwear according to claim 1, wherein said ring ends comprise outwardly, rearwardly extending lugs which function as handles for spreading said ring for application to or removal from a hoof.

3. Equine footwear according to claim 2, wherein said strap ends terminate in outwardly, rearwardly extending lugs having axially aligned bores, and said fastener means extends through said bores.

4. Equine footwear according to claim 1, wherein said flanges are tapered toward their free edges and at their apex the outer surface of said flanges define a sharp, ground engaging edge.

5. Equine footwear according to claim 4, wherein the bottom surface of said lower flange comprises a ground engaging inclined surface bounded by said edge.

6. Equine footwear according to claim 5, wherein the portions of said ring adjacent said ends extend toward each other and the upper and inner surfaces of said lower and upper flanges curve upwardly and toward each other to define rounded areas for cradling the heel portion of a hoof.

7. Equine footwear according to claim 6 wherein the bottom surfaces of said end portions substantially are coplanar and are inclined upwardly from said ground engaging area.

8. Equine footwear according to claim 1 wherein said ring is molded of a synthetic plastic material.

* * * * *